United States Patent [19]

Matsumoto

[11] Patent Number: 5,278,746
[45] Date of Patent: Jan. 11, 1994

[54] HIGH VOLTAGE GENERATOR

[75] Inventor: Tadahiko Matsumoto, Nagaokakyo, Japan

[73] Assignee: Murata Mfg. Co., Ltd., Kyoto, Japan

[21] Appl. No.: 925,751

[22] Filed: Aug. 7, 1992

[30] Foreign Application Priority Data

Aug. 12, 1991 [JP] Japan ................... 3-226549
Apr. 30, 1992 [JP] Japan ................... 4-137951

[51] Int. Cl.$^5$ ..................... H02M 3/335; H04N 3/185
[52] U.S. Cl. ........................... 363/21; 363/97; 315/411; 358/190
[58] Field of Search .... 363/18–21, 59–61, 95, 97, 131; 323/224; 315/399, 408–411; 358/190

[56] References Cited

U.S. PATENT DOCUMENTS

| | | | |
|---|---|---|---|
| 4,234,827 | 11/1980 | Willis | 315/408 |
| 4,614,899 | 9/1986 | Webb et al. | 315/411 |
| 4,823,248 | 4/1989 | Ikeuchi et al. | 363/20 |
| 4,931,716 | 6/1990 | Jovanovic et al. | 323/285 |
| 5,019,953 | 5/1991 | Kawaberi et al. | 363/21 |
| 5,189,599 | 2/1993 | Messman | 363/21 |

*Primary Examiner*—Steven L. Stephan
*Assistant Examiner*—Adolf Berhane

[57] ABSTRACT

In a high voltage generator including a flyback transformer having a low-voltage coil and a high-voltage coil, a first switching element is disposed in a current path between a drive power source, the low-voltage coil and ground. The first switching element is turned on and off so as to charge and discharge a resonance capacitor, thereby generating flyback pulses. An output voltage of the high-voltage coil is detected. A peak value of the flyback pulse is controlled based on the detected output voltage so as to stabilize the output voltage of the high-voltage coil. A second switching element is located in the current path between the drive power source, the low-voltage coil and ground. The second switching element is turned on the moment the first switching element is turned off, thereby transferring electrical energy stored in the low-voltage coil to the resonance capacitor. After the transfer of the electric energy, a charging capacitor is charged by an inverse current flowing from the resonance capacitor to the drive power source.

16 Claims, 11 Drawing Sheets

HIGH VOLTAGE GENERATOR

BACKGROUND OF THE INVENTION

1. Field of the Invention

This invention relates to a high voltage generator which boots flyback pulses (collector pulses) so as to obtain a high voltage to be supplied to an anode of a cathode ray tube.

2. Description of the Related Art

Usually, a high voltage generator supplies a high voltage in the order of tens of kilovolts, to an anode of a cathode ray tube in a television receiver, a display, or the like. The high voltage generator obtains such a high voltage by boosting and rectifying flyback pulses generated in a horizontal output circuit. A flyback transformer is used to boost the flyback pulses.

There is currently available a high voltage generator which includes a deflection yoke unit at a low-voltage coil side of the flyback transformer. In this arrangement, flyback pulses are used to obtain a sawtooth deflection current to be applied to the deflection yoke unit.

Such a high voltage generator often suffers from a problem that correction of the high output voltage adversely affects the operation of a circuit in the deflection yoke unit. Specifically, a voltage is applied to compensate for a drop in the high voltage so as to stabilize the high voltage, which adversely affects the deflection yoke circuit.

Recently, there has been proposed a circuit configuration in which the high voltage generator and the deflection yoke circuit are independent of each other so as to prevent interference between them. In such a configuration, the flyback pulses are generated in synchronization with the period of a horizontal deflection current from a horizontal output circuit.

FIG. 16 of the accompanying drawings shows one example of the foregoing high voltage generators. This circuit is disclosed in Japanese Patent Laid-Open Publication Hei 2-222374 corresponding to U.S. Pat. No. 5,019,953, and generates flyback pulses in synchronization with horizontal drive signals HD of a horizontal output circuit, rectifying the flyback pulses so as to obtain a high output voltage.

In the circuit, a peak value of the flyback pulses boosted by the flyback transformer is controlled by controlling the on-time of a transistor 1. Assume that an on-time 1a is changed to an on-time 1b (as shown in FIG. 17(b)), i.e. the on-time 1a is lengthened. In this case, a collector current of an output transistor 4 flowing during an off-time of the transistor 1 (i.e. a closed loop current flowing via a diode 2, a low-voltage coil of the flyback transformer and the output transistor 4 and returning to the diode 2) becomes large as shown in FIG. 17(c), so that the peak value of the flyback pulses applied to the low-voltage coil also becomes large as shown in FIG. 17(a). On the contrary, when the on-time of the transistor 1 is shortened from 1a to 1c as shown in FIG. 17(b), a small collector current flows via the transistor 4 during the off-time of the transistor 1 (as shown in FIG. 17(c)), thereby leading to a reduced peak value of the flyback pulses (as shown in FIG. 17(a)).

Therefore, the peak value of the flyback (collector) pulses depends upon the on-period of the pulse signal to be applied to the base of the transistor 1. The on-period of the pulse signal is determined by the timing to turn off the transistor 1.

As described above, the high voltage generator boosts the collector pulses in the flyback transformer, and rectifies them in a rectifier so as to obtain a high output voltage. The generated high output voltage is detected by a high output voltage detecting circuit. Then, the on-time of the pulse control signal is controlled based on the detected results, thereby stabilizing the high voltage by compensating for a drop therein.

However, a large amount energy is required for the flyback operation, which means that a large collector current flows through the transistor 4. The large collector current is consumed by element such as the diode 2, the low-voltage coil of the flyback transformer and the transistor 4 in the closed loop and is transformed to the heat. Therefore, this closed loop current may be one of the factors which reduces the circuit efficiency.

The transistor 1 is switched on and off during the scanning operation of the television receiver or display unit. Noises caused by the switching of the transistor 1 may distort a raster appearing on the screen of television receiver or display unit.

When compensating for the voltage drop, the generator circuit conventionally operates to reduce the output voltage as compared with the voltage before the compensation, so that an input voltage at a power source +B and a boost ratio of the flyback transformer have to be large. This means that electronic components in the generator circuit are subject to a large load.

SUMMARY OF THE INVENTION

With the foregoing problems in mind, this invention aims at providing a high voltage generator. A first object of the invention is to improve circuit efficiency by reducing power consumption caused by feeding back a large current after the off-time of the transistor 1. A second object is to switch elements, such as transistors for generating flyback pulses, at a voltage of zero volts so that less noise will be generated during the scanning operation. A third object is to raise an output voltage of a high voltage coil, to reduce the boost ratio of the flyback transformer when compensating for the voltage drop, and to reduce the current or voltage applied to the electronic components.

According to a first aspect of the invention, there is provided a high voltage generator comprising:

(a) a flyback transformer including a low-voltage coil and a high voltage coil;

(b) a first switching element which is turned on to store the energy of a forward current from a drive power source in the low-voltage coil, and is located in a path of current path flowing through the drive power source, the low-voltage coil and ground;

(c) a resonance capacitor whose charging and discharging operations are controlled by the first switching element so as to be resonant with the low-voltage coil in response to an on-state and off-state of the first switching element;

(d) an output voltage detecting means for detecting an output voltage of the high-voltage coil directly or indirectly; and (e) an input peak value controlling means for controlling the input peak value of the low-voltage coil in response to a variation of the detected voltage, including:

a second switching element located in the current path;

a charging capacitor whose charging operation is controlled by the second switching element and whose voltage is used for biasing an input voltage to the low-voltage coil; and a means for controlling the on-off action of the first and second switching elements, which turns on the second switching element substantially simultaneously with turning off the first switching element so as to transfer the energy stored in the low-voltage coil to the resonance capacitor, and which turns off the second switching element after the transfer of the energy so that the charging capacitor is charged by an inverse current flowing from ground to the drive power source, thereby correcting the variation of the output voltage of the high-voltage coil by using the voltage of the charging capacitor.

In this arrangement, the forward current flows from the drive power source via the first switching element in the on-state so as to store energy in the low-voltage coil. Under this condition, when the first switching element is turned off and the second switching element is turned on, the energy in the low-voltage coil is transferred to the resonance capacitor. Thereafter, the inverse current flows from ground to the drive power source, charging the charging capacitor. The input voltage of the low-voltage coil is biased by the voltage of the charging capacitor.

The voltage of the charging capacitor varies with the period of time during which the inverse current flows. The shorter the on-state of the second switching element, the longer the inverse current flows. Therefore, the shorter the on-state of the second switching element, the higher the voltage of the charging capacitor. The voltage of the charging capacitor is controlled by the off-timing of the second switching element.

With this arrangement, no loop current flows at the low-voltage coil when correcting the output of the high-voltage coil. Therefore, the high voltage generator assures excellent circuit efficiency compared with the circuit efficiency of the conventional high voltage generator. In addition, the second switching element is turned off at a voltage of zero volts, thereby suppressing noise caused by the switching operation. To correct the output of the high-voltage coil, the voltage of the charging capacitor is applied to the input of the low-voltage coil, so that the boost ratio of the flyback transformer can be reduced and voltage supplied across the electronic components can also be reduced.

According to a second aspect of the invention, there is provided a high voltage generator comprising:

(a) a flyback transformer including a low-voltage coil and a high voltage coil;

(b) a first switching element which is turned on to store the energy of a forward current from a drive power source in the low-voltage coil, and is located in a path of current flowing through the drive power source, the low-voltage coil and ground;

(c) a resonance capacitor which is coupled in series with the low-voltage coil and whose charging and discharging operations are controlled by the first switching element;

(d) an output voltage detecting means for detecting an output voltage of the high-voltage coil directly or indirectly; and (e) an input peak value controlling means for controlling the input peak value of the low-voltage coil in response to a variation of the detected voltage, which includes:

a second switching element coupled in series with the first switching element;

a charging capacitor whose charging operation is controlled by the second switching element and whose voltage is used for biasing an input voltage to the low-voltage coil; and a means for controlling the on-off action of the first and second switching elements, by turning on the second switching element substantially simultaneously with turning off the first switching element so as to transfer the energy stored in the low-voltage coil to the resonance capacitor, and by turning off the second switching element after the transfer of the energy so that the charging capacitor and the resonance capacitor are charged by an inverse current flowing from ground to the drive power source, thereby correcting the variation of the output voltage of the high-voltage coil by using the voltages of the charging capacitor and the resonance capacitor.

In this arrangement, the resonance capacitor functions as part of the charging capacitor referred to in the first aspect.

According to a third aspect of the invention, there is provided a high voltage generator in which the resonance capacitor of the first arrangement also functions as the charging capacitor. The high voltage generator comprises:

(a) a flyback transformer including a low-voltage coil and a high voltage coil;

(b) a first switching element which is turned on to store the energy of a forward current from a drive power source in the low-voltage coil, and is located in a path of current flowing through the drive power source, the low-voltage coil and ground;

(c) a resonance capacitor which is coupled in series with the low-voltage coil and whose charging and discharging operations are controlled by the first switching element;

(d) an output voltage detecting means for detecting an output voltage of the high-voltage coil directly or indirectly; and (e) an input peak value controlling means, for controlling the input peak value of the low-voltage coil in response to a variation of the detected voltage, which includes:

a second switching element coupled in series with the first switching element, the series circuit of the first and second switching elements being coupled in parallel to the resonance capacitor; and a means for controlling the on-off action of the first and second switching elements, by turning on the second switching element substantially simultaneously with turning off the first switching element so as to transfer the energy stored in the low-voltage coil to the resonance capacitor, and by turning off the second switching element after the transfer of the energy so that the resonance capacitor is charged by an inverse current flowing from the ground to the drive power source, thereby correcting the variation of the output voltage of the high-voltage coil by the voltage of the resonance capacitor.

The high voltage generator of this invention can be modified and changed in various ways as described below.

The output voltage detecting means may be of a type which rectifies an output of the high-voltage coil so as to detect the output voltage thereof as a rectifying value.

The on-off state controlling means may include a horizontal drive circuit for providing binary horizontal drive signals so as to control the on-off timing of the first switching element. The integrated value of the horizontal drive signal (varying with the duty cycle of the horizontal drive signal) and the rectifying value of the output waveform of the high-voltage coil are compared, so that the off-timing of the second switching element is determined based on the compared results so as to assure optimum correction of the output voltage.

The damper diode may be coupled in parallel with the first or second switching element. When the first or second switching element is a transistor having the equivalent of a built-in diode, the damper diode may be dispensed with.

The second switching element and the charging capacitor may be located at either the ground side or the power source side of the low-voltage coil.

Further, the high voltage generator may be modified in the following manner: the DC cutoff capacitor, having a larger electrostatic capacity than that of the charging capacitor, may be coupled in series with the charging capacitor; a circuit (composed of a coil as a dummy deflection yoke and a capacitor,) coupled in parallel to the resonance capacitor, may be used to bear part of the current flowing to the low-voltage coil; a series circuit of the deflection yoke and the capacitor for S-shaped correction of the deflection current may be coupled in parallel to the first switching element; a circuit or a component may be inserted between the series circuit of the deflection yoke and the foregoing capacitor, and the first switching element so as to eliminate noise caused by the turning-off of the second switching element; and a third coil may be coupled in parallel to the low-voltage coil so as to suppress a leakage flux of the flyback transformer.

DETAILED DESCRIPTION

Figure 1:
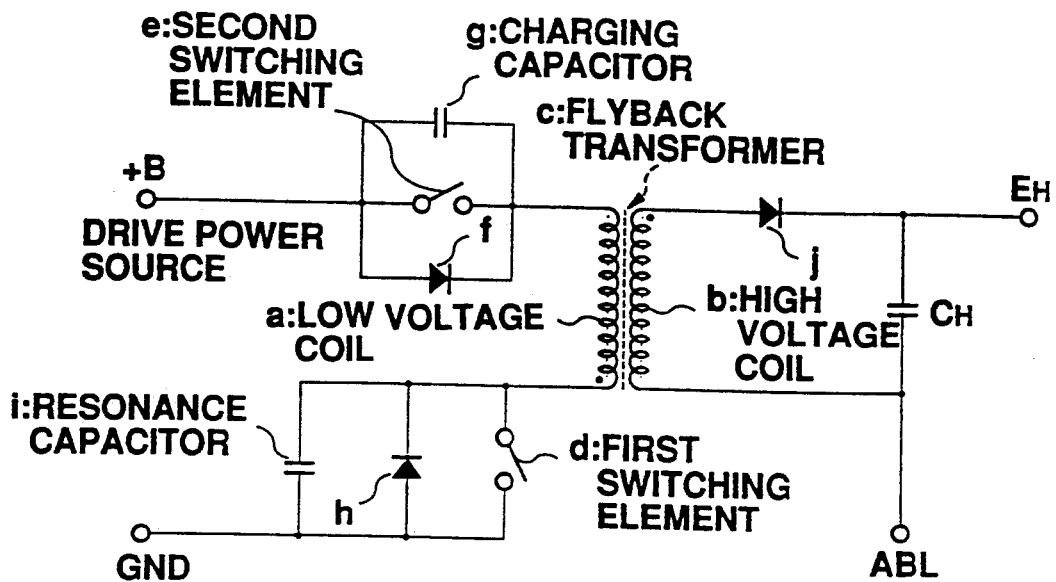
FIG. 1 is a circuit diagram of a high voltage generator, showing the basic configuration according to the present invention.

The present invention will be described with reference to preferred embodiments shown in the drawings.

FIG. 1 shows the basic configuration of a high voltage generator according to the invention. The high voltage generator includes a flyback transformer c having a low-voltage coil a and a high-voltage coil b. A first switching element d and a second switching element e are connected to the low-voltage coil a. A charging capacitor g and a diode f are connected in parallel to the second switching element e. A resonance capacitor i and a diode h are connected in parallel to the first switching element d. The high-voltage coil b is connected in parallel to a capacitor $C_H$ via a diode j. A drive power source voltage +B is applied to the low-voltage coil a, so that a high output voltage $E_H$ is taken out from one end of the capacitor $C_H$.

Figure 2:
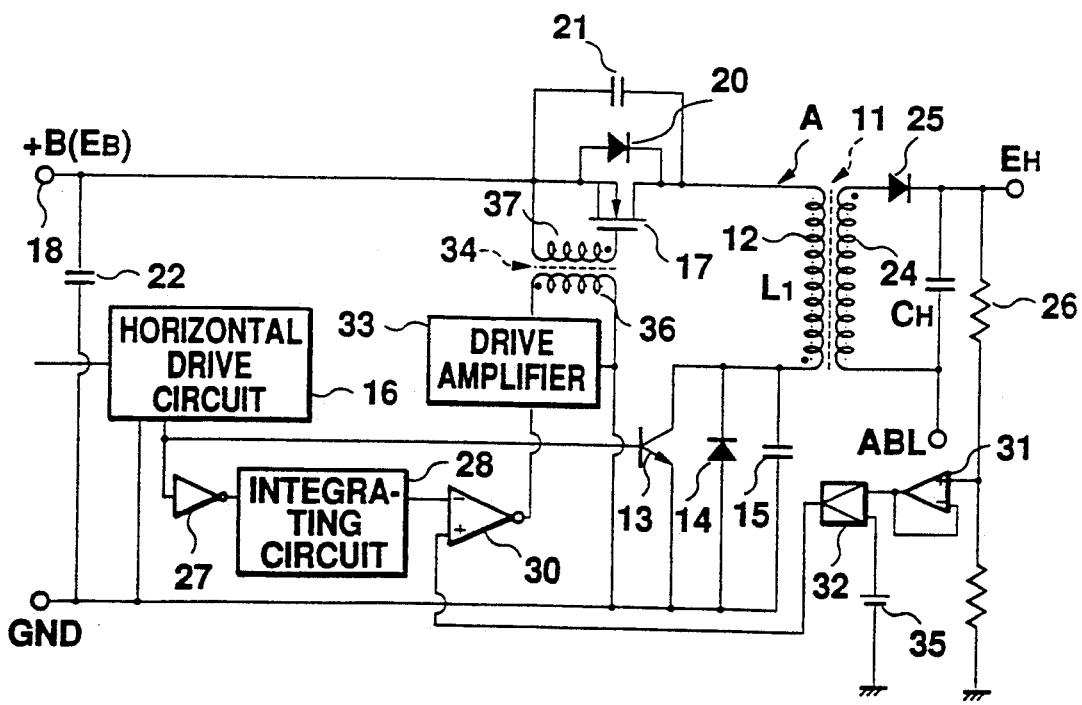
FIG. 2 is a circuit diagram of a high voltage generator according to a first embodiment.

FIG. 2 shows the circuit configuration according to a first modification of the basic circuit. In FIG. 2, a transistor 13 serving as the first switching element d is connected in series with the start side of a low-voltage coil 12 of a flyback transformer 11. A damper diode 14 and a resonance capacitor 15 are respectively connected in parallel to the transistor 13. The transistor 13 is connected to ground at its emitter (to a grounding line in FIG. 2). The transistor 13 has applied at its base a horizontal drive signal from a horizontal drive circuit 16. The horizontal drive signal is synchronized with a horizontal output circuit (not shown). Refer to FIG. 4(a) for the horizontal drive signal.

The drain of a MOS FET 17 serving as the second switching element e is connected to the other side of the low-voltage coil 12. A drive source voltage $+B(E_B)$ is applied to the source of the MOS FET 17. A diode 20 and a charging capacitor 21 are connected in parallel across the drain and the source of the MOS FET 17. The diode 20 may be externally attached to the MOS FET 17, or may be a diode built into the MOS FET 17 as an equivalent circuit. A capacitor 22 whose capacity is much larger than that of the charging capacitor 21 is disposed between the source of the MOS FET 17 and the grounding line.

A high-voltage end of the high-voltage coil 24 of the flyback transformer 11 is connected to an anode of a non-illustrated cathode ray tube via a high-voltage rectifying diode 25. A bleeder resistor 26 is coupled to the high-voltage end of the high-voltage coil 24 so as to detect the high output voltage $E_H$ as a potential dividing voltage. In this embodiment, a pulse signal for driving the MOS FET 17 is obtained by using the signal indicating the detected high voltage (i.e. potential dividing value) and the horizontal drive signal of the foregoing horizontal drive circuit 16.

A circuit for obtaining the signal for driving the MOS FET 17 includes an inverter 27, an integrating circuit 28, a comparator 30, a buffer amplifier 31, an error amplifier 32, a drive amplifier 33, and a drive transformer 34. The inverter 27 inverts the horizontal drive signal of FIG. 3(b) to obtain a signal as shown by FIG. 3(c). The integrating circuit 28 integrates the output of the inverter 27, and applies a signal having an integrated waveform (as shown in FIG. 3(d)) to a minus terminal of the comparator 30.

The buffer amplifier 31 amplifies the detection signal indicating the detected high output voltage, and applies it to the error amplifier 32. The error amplifier 32 compares the output of the buffer amplifier 31 with the reference voltage. As the high output voltage drops further with time as shown in FIG. 3(a), an error amplifier signal becomes large as shown by a dotted line in FIG. 3(d), being applied to a plus terminal of the comparator 30.

The comparator 30 compares the integrated output from the integrating circuit 28 with the error amplifier signal from the error amplifier 32, outputting a pulse drive signal whose level rises with the rise of the integrated waveform and falls at a position where the integrated waveform and the error amplifier signal intersect. In other words, the comparator 30 generates the pulse drive signal whose width is narrowed as the high output voltage drops gradually, and provides the signal to the drive amplifier 33.

The drive amplifier 33 amplifies the pulse drive signal, applying the amplified pulse drive signal to a primary coil 36 of a drive transformer 34. The drive transformer 34 provides via its secondary coil 37 the amplified pulse drive signal shown in FIG. 3(e) to the gate of the MOS FET 17. Specifically, the amplified pulse drive signal applied to the MOS FET 17 has its width narrowed with the increase in the high output voltage, but has its width widened with the decrease in the voltage drop, as shown in FIG. 4(b).

Figure 4:
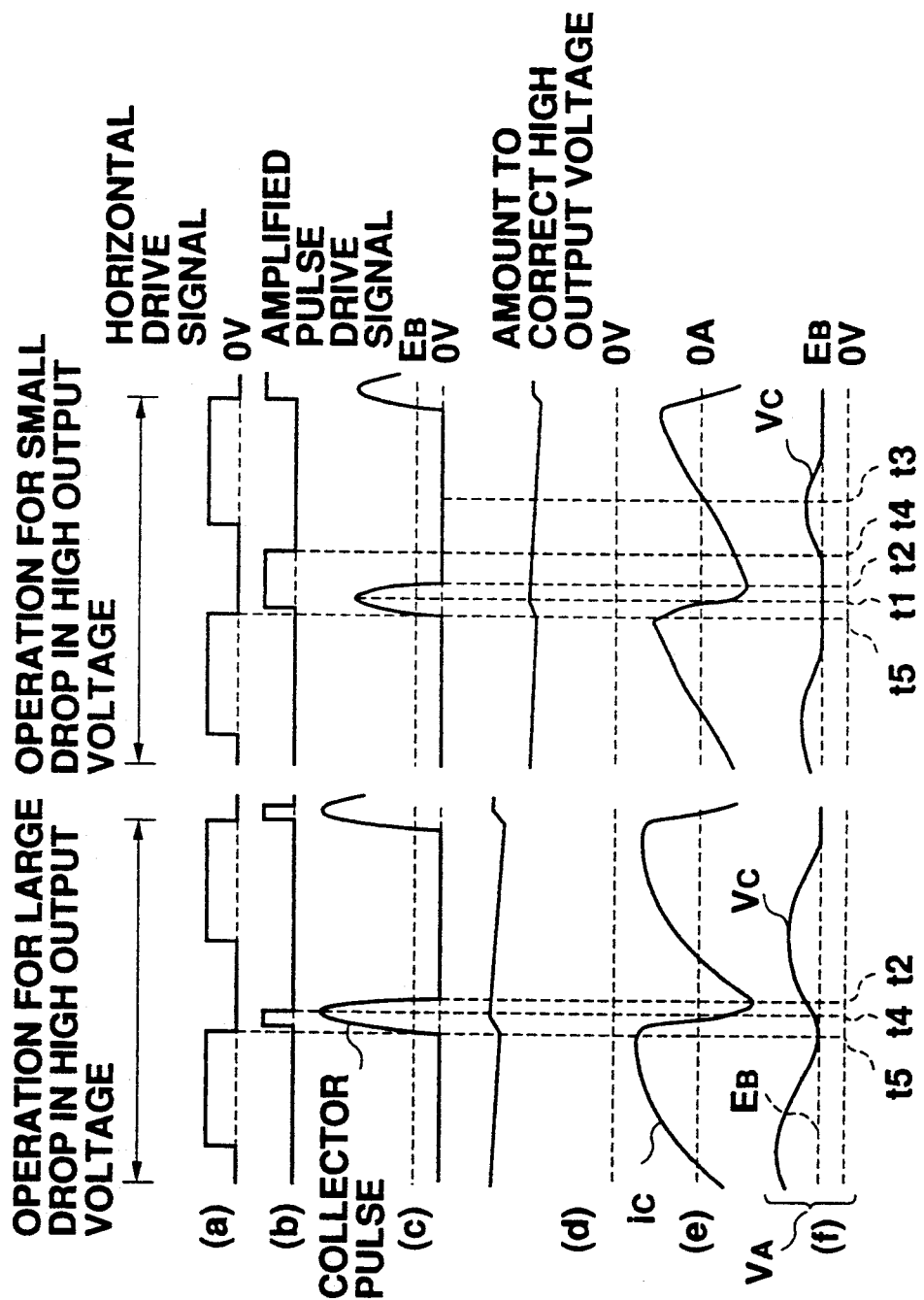
FIG. 4 shows the operation for stabilizing the high output voltage in the high voltage generator of FIG. 2.

The high output voltage will be stabilized as described below with reference to the circuit and the timing chart of FIGS. 2 and 4. When the level of the horizontal drive signal rises before the charging capacitor 21 stores electric energy, the transistor 13 is turned on, and the MOS FET 17 is turned off. A forward current flows from a drive power source terminal 18 to the diode 20, the low-voltage coil 12 and the transistor 13. Then, a collector current $i_c$ of the transistor 13 flows to ground. The collector current $i_c$ linearly increases according to $E_B/L_1$, where $E_B$ represents the voltage of the drive power source, and $L_1$ an inductance of the low-voltage coil 12.

Under this condition, when the level of the horizontal drive signal falls so that the transistor 13 is turned off, the electric energy stored in the inductance $L_1$ of the low-voltage coil 12 causes a current to flow to the resonance capacitor 15, thereby generating a collector pulse voltage as shown in FIG. 4(c). While the forward current flows from the power source terminal 18 via the diode 20 after the transistor 13 has been turned off, the level of the amplified drive pulse signal rises so as to turn the MOS FET 17 on. The current from the power source flows to ground via the MOS FET 17, the diode 20, the low-voltage coil 12, and the resonance capacitor 15. At this time, the electric energy stored in the low-voltage coil 12 is transferred to the resonance capacitor 15 and charged in the resonance capacitor 15. However, the electric energy in the low-voltage coil 12 gradually decreases to become zero (0) at the time point $t_1$. On the contrary, the collector pulse voltage reaches its peak.

When all the electrical energy is completely transferred to the resonance capacitor 15, an inverse current flows from the resonance capacitor 15 to the power source via the low-voltage coil and the MOS FET 17. When the resonance capacitor 15 becomes more resonant with the inductance $L_1$ of the low-voltage coil 12, and when the collector voltage is 0 volts or less at the time point $t_2$, the damper diode 14 is turned on, so that the inverse current flows from the dumper diode 14 to the power source terminal 18 via the low-voltage coil and the MOS FET 17.

When the level of the amplified drive pulse signal falls and the MOS FET 17 is turned off during the flow of the inverse current to the power source terminal 18, the inverse current flows into the charging capacitor 21. A charging voltage $V_c$ across the charging capacitor 21 rises very gently as shown in FIG. 4(f) in response to a series resonance waveform due to an electrostatic capacity of the charging capacitor 21 and the inductance of the low-voltage coil 12. When the voltage $V_C$ increases, a potential difference $V_A$ of the output side of the MOS FET 17, i.e. between the winding end A of the low-voltage coil and the grounding line, is a sum of the voltage $E_B$ at the power source terminal and the charge voltage $V_C$, i.e. $V_A = E_B + V_C$. In other words, the power source voltage $E_B$ seems to equivalent increase by $V_C$. The inverse current flowing to the power source terminal 18 from the low-voltage coil 12 via the charging capacitor 21 decreases abruptly.

When the level of the horizontal drive signal rises while the inverse current flows from the damper diode 14 so that the transistor 13 is turned off, the inverse current is decreased to zero (0) at the time point $t_3$. The charging voltage $V_C$ of the charging capacitor 21 is at the peak value under this condition. The voltage $V_A$ (consisting of the power source voltage $E_B$ and the charging voltage $V_C$) is applied to the low-voltage coil 12, so that the collector current gradually starts to flow to the transistor 13. At the same time, the charging voltage $V_C$ begins to decrease gradually. When the charging voltage $V_C$ begins to decrease gradually. When the charging voltage becomes zero (0), the whole circuit returns to the initial condition, thereby restarting the foregoing operation.

Figure 3:
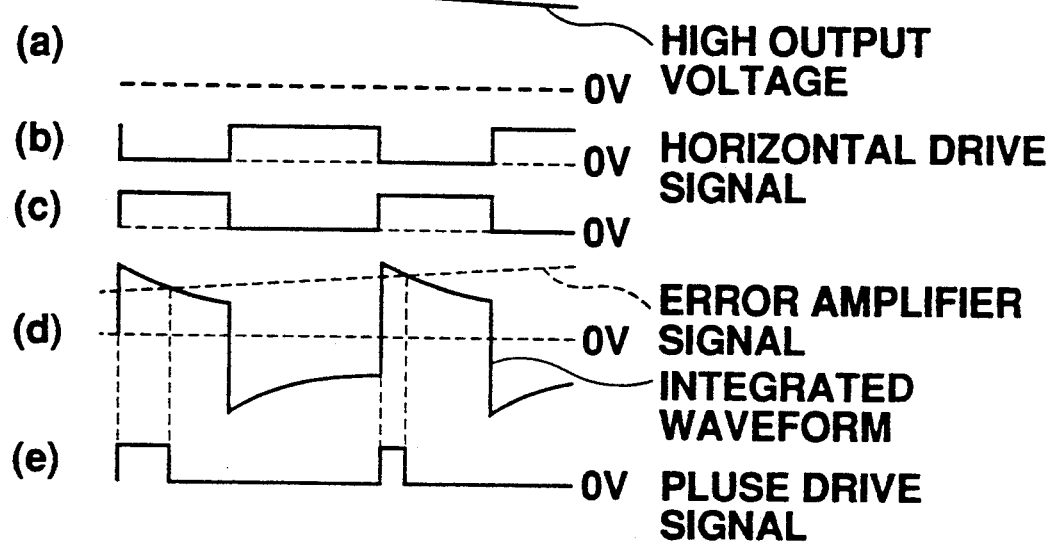
FIG. 3 shows the operation for generating pulse drive signals in the high voltage generator of FIG. 2.

In the foregoing embodiment, the pulse width of the amplified drive pulse signal is narrowed as the high output voltage drops extensively as shown in FIG. 3. The more the pulse width is narrowed, the shorter the time that the MOS FET 17 maintains its on-state, and the longer the inverse current flows to the power source terminal 18 through the charging capacitor 21. Therefore, the charging voltage $V_C$ in the charging capacitor 21 becomes larger, thereby increasing the voltage $V_A$ to be applied to the portion A of the low-voltage coil 12. When the forward current flows to the transistor 13 next time, the peak value of the collector current becomes larger, thereby stabilizing the high output voltage.

When the forward current flows to the diode 20, the MOS FET 17 is turned on while the current and the voltage remain zero (0) between the drain and the source of the MOS FET 17. In other words, the on-action of the MOS FET 17 is carried out while both the current and voltage are zero (0), respectively, as shown at the time point $t_5$ in FIG. 4(f). The MOS FET 17 is turned off while the inverse current flows to the power source terminal 18 from the low-voltage coil 12 via the MOS FET 17, i.e. when the voltage across the drain and the source of the MOS FET 17 is zero (0). Therefore, the MOS FET 17 can be effectively turned on and off without any substantial power loss.

In the foregoing embodiment, the peak value of the collector pulses is controlled by controlling the timing of the turning off of the MOS FET 17. Since no large current is fed back through the closed loop, as compared with the conventional device, and since no power loss is caused by such a large current, the efficiency of the high voltage generator can be further improved. As shown in FIG. 3, the rise of the level of the amplified drive pulse signal during the on-time of the MOS FET 17 agrees with the fall of the level of the horizontal drive signal. The rise or the amplified drive pulse signal level may be somewhat delayed by using a delay element as shown in FIG. 4(b).

The point in time at which to turn off the MOS FET 17 can be determined as desired during the flow of the inverse current to the power source terminal 18 from the low-voltage coil 12. Therefore, the time to turn off the MOS FET 17 can be set during a long period of time (the timing to turn off the MOS FET 17 can be varied within $t_1$ to $t_3$). Therefore, the high voltage generator can correct an extensive drop in high output voltage that making it applicable to any existing multiple scanning type television receiver or display.

Since the MOS FET 17 is turned off at zero volts, switching noise can be minimized, thereby preventing the images from being distorted.

When the high output voltage drops extensively, the flyback (collector) pulse is controlled to raise the peak value compared with the case where no compensation is performed, the power source voltage and the boost rate of the flyback transformer can be reduced, thereby reducing the load applied to the electronic components. In addition, heat generated by the flyback transformer can also be reduced.

Figure 5:
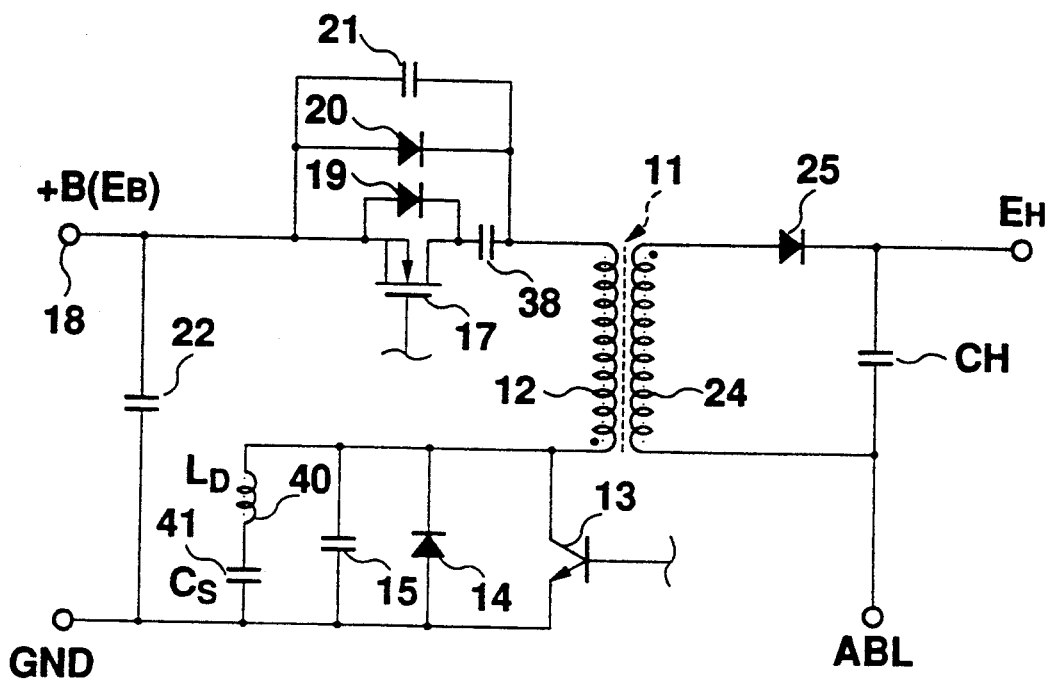
FIG. 5 is a circuit diagram of a high voltage generator according to a second embodiment.

FIG. 5 shows the circuit configuration of a high voltage generator according to the second embodiment. In this embodiment, the amplified drive pulse signal whose pulse width is narrowed in response to the drop of the high output voltage is applied to the MOS FET 17 in a similar manner as in the foregoing embodiment. The circuit for generating this signal is the same as that of the foregoing embodiment, and will not be described here. In this embodiment, a capacitor such as a DC cutoff capacitor 38 whose capacity is 30 to 40 times as large as that of the charging capacitor 21 is coupled in series with the drain side of the MOS FET 17. The diode 20 and the charging capacitor 21 are connected in parallel to the series circuit of the MOS FET 17 and the capacitor 38. Further, the diode 19 is connected in parallel to the MOS FET 17.

In the second embodiment, the forward current from the power source terminal 18 flows to the low-voltage coil via the diode 20 while the MOS FET 17 is in the off-state. On the contrary, when the MOS FET 17 is in the on-state, the forward current flows to the low-voltage coil 12 via the MOS FET 17 and the DC cutoff capacitor 38. The inverse current flows from the low-voltage coil 12 to the power source terminal 18 via the capacitor 38 and the MOS FET 17 while the MOS FET 17 is in the on-state. Otherwise, the inverse current flows to the power source terminal via the charging capacitor 21 while the MOS FET 17 is in the off-state. When the inverse current flows through the charging capacitor 21, the charge voltage $V_C$ is accumulated therein so as to compensate for the drop of the high output voltage in the similar manner as that in the first embodiment.

In the circuit of FIG. 5, a series circuit composed of a choke coil 40 and a capacitor 41 is connected in parallel to the resonance capacitor 15. This series circuit reduces the current flowing to the low-voltage coil 12, keeping the flyback transformer 11 from overheating, and improving the regulation characteristics of the flyback transformer 11. It may be omitted if not specifically required.

Figure 6:
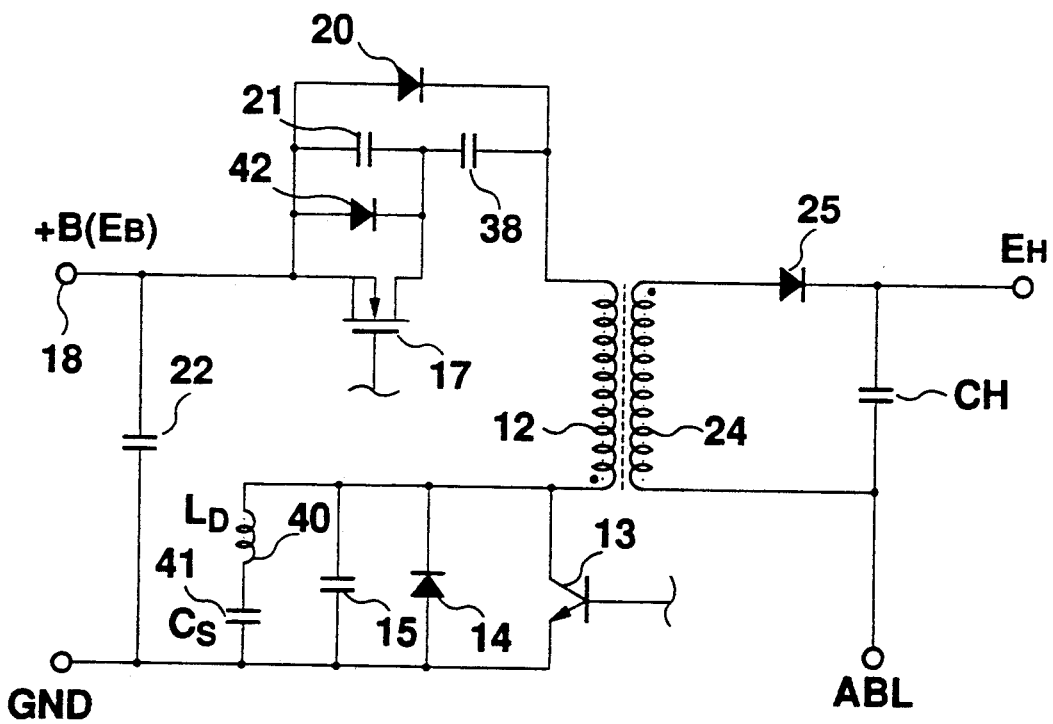
FIG. 6 is a circuit diagram of a high voltage generator according to a third embodiment.

FIG. 6 shows the circuit configuration of a high voltage generator according to the third embodiment. The amplified drive pulse signal, whose pulse width is controlled in response to the drop of the high output voltage, is also applied to the gate of the MOS FET 17 in a manner similar to that of the first embodiment. The circuit for obtaining the amplified drive pulse signal is omitted here since it is similar to that in the first embodiment. In this embodiment, the MOS FET 17, a diode 42 and the capacitor 21 are connected in parallel to one another. A capacitor 38 whose capacity is 30 to 40 times as large as the charging capacitor 21, for example, is connected in series with the foregoing parallel-connected members. In addition, the diode 20 is connected in parallel to the series-connected charging capacitor 21 and the capacitor 38.

The forward current flows from the power source terminal 18 to the low-voltage coil 12 via the diode 20 when the MOS FET 17 is kept in the off-state. Otherwise, the forward current flows from the power source terminal 18 to the low-voltage coil 12 via the capacitor 38.

The inverse current flows from the low-voltage coil 12 to the power source terminal via the capacitor 38 and the MOS FET 17 when the MOS FET 17 is in the on-state. On the contrary, the inverse current flows to the power source terminal 18 via the capacitor 38 and the charging capacitor 21 when the MOS FET 17 in the off-state. Under this condition, a charge voltage is accumulated in the capacitor 38 and the charging capacitor 21 (actually, no charging voltage is generated in the capacitor 38 whose capacity is much larger than that of the charging capacitor 21, but a large charge voltage is generated in the charging capacitor 21), thereby stabilizing the high output voltage in a similar manner to that of the first embodiment. The choke coil 40 and the capacitor 41 are also used in this embodiment, but they may be dispensed with if they are not particularly necessary.

Figure 7:
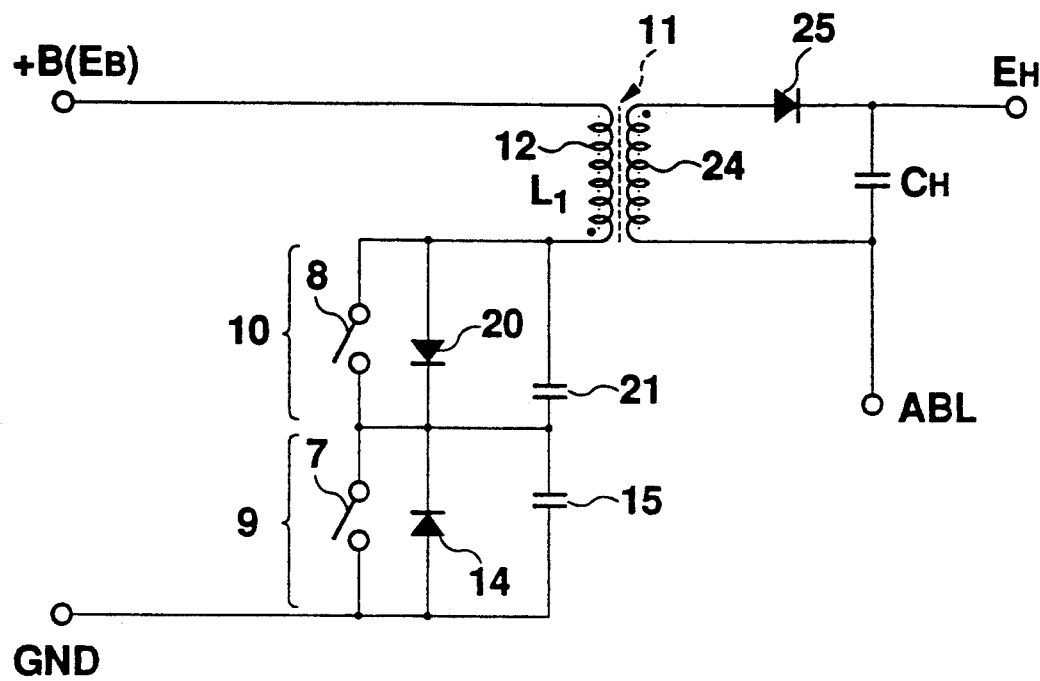
FIG. 7 is a circuit diagram of a high voltage generator according to a fourth embodiment.
Figure 8:
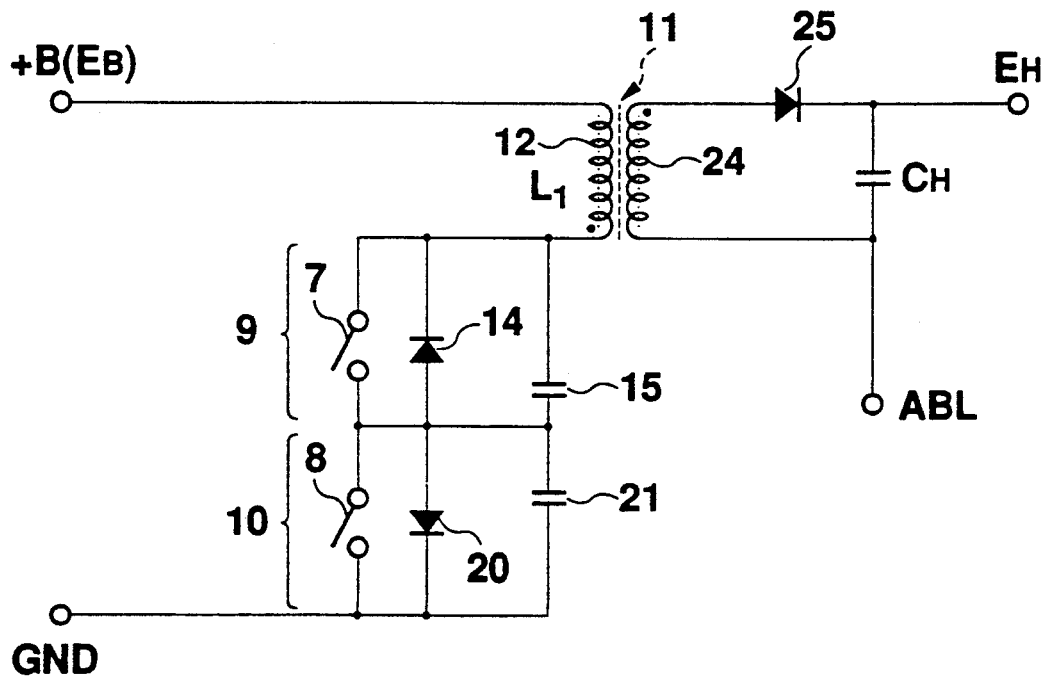
FIG. 8 is a circuit diagram of a high voltage generator according to a fifth embodiment.

FIGS. 7 and 8 show the circuit configurations of high output voltage generators according to the fourth and fifth embodiments, respectively. In these embodiments, a second switching element 8 such as a MOS FET is disposed between the low-voltage coil 12 and ground. Specifically, the charging capacitor 21, the diode 20 and the second switching element 8 are connected in parallel to one another so as to constitute a second circuit block 10. The resonance capacitor 15, the damper diode 14 and the first switching element 7, such as a transistor, are connected in parallel with one another so as to constitute a first circuit block 9. The first and second circuit blocks 9 and 10, which are connected in series are disposed between the low-voltage coil 12 and ground. The other components are identical to those in the foregoing embodiments.

In the fourth embodiment, the second circuit block is located adjacent to the low-voltage coil 12 while the first circuit block 9 is near the grounding line. These circuit blocks are connected in series. In the fifth embodiment, the first circuit block 9 is adjacent to the low-voltage coil 12, and the second circuit block 10 is adjacent to the grounding line. These circuit blocks are connected in series. In these embodiments, the first switching element 7 is usually turned on and off by the drive transformer.

In the fourth and fifth embodiments, the high voltage generators stabilize the high output voltage in a similar manner as those in the foregoing embodiments.

Figure 9:
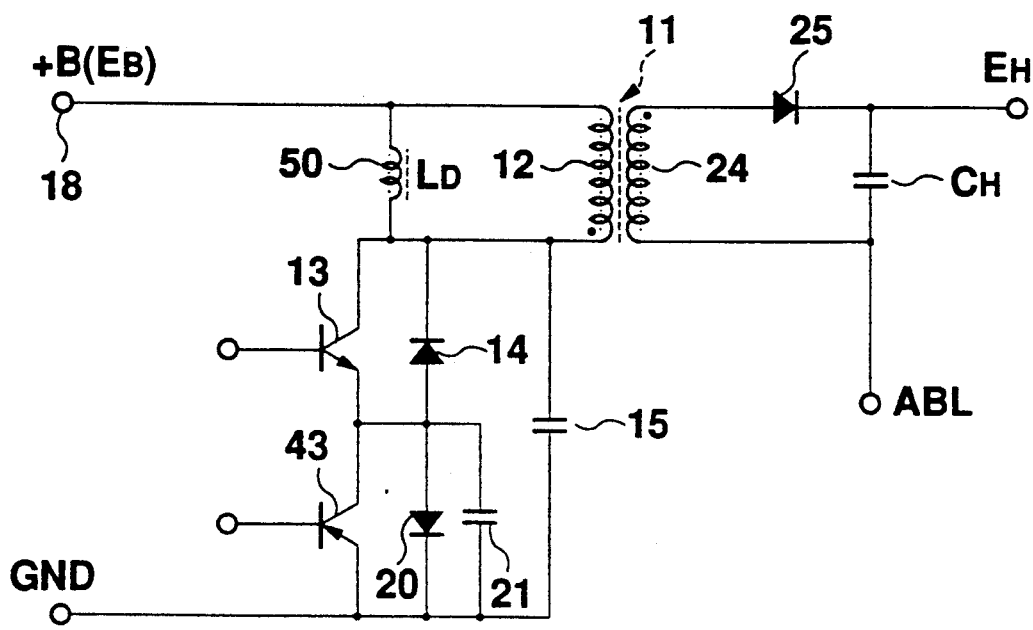
FIG. 9 is a circuit diagram of a high voltage generator according to a sixth embodiment.

FIG. 9 shows the circuit configuration of a high voltage generator according to the sixth embodiment. This embodiment features: that (1) a choke coil 50 connected in series with the low-voltage coil 12; (2) a first circuit block (composed of the transistor 13 as the first switching element connected in parallel with the damper diode 14) connected in series with the start side of the low-voltage coil 12; (3) a second circuit block (composed of the transistor 43 as the second switching element, the diode 20 and the charging capacitor 21, which are connected in parallel), connected in series with the first circuit block; and (4) the resonance capacitor 15 connected in parallel to the first and second circuit blocks which are in series with each other. The remaining circuit components are identical to those of in foregoing embodiments.

In this embodiment, the choke coil 50 is connected to the low-voltage coil 12 so as to serve as an inductance element, so that it is possible to suppress a leakage flux of the flyback transformer 11 and to prevent the low-voltage coil 12 in the flyback transformer 11 from being overheated.

The inverse current flows from the ground to the drive power source via the charging capacitor 21 or via the resonance capacitor 15. Therefore, the resonance capacitor 15 also charges the electric energy of the inverse current, functioning as part of the charging capacitor 21.

When comparing the circuits of FIGS. 8 and 9, it is known that these circuits operate identically under certain conditions, i.e. $C_1 = C_1'$ and $C_1 + C_2 = C_2'$, where $C_1'$ denotes electrostatic capacity of the resonance capacitor 15 in the circuit shown in FIG. 8, $C_2'$ the electrostatic capacity of the charging capacitor 21 in the circuit in FIG. 8, $C_1$ the electrostatic capacity of the resonance capacitor 15 in the circuit of FIG. 9, and $C_2$ the electrostatic capacity of the charging capacitor 21 in the circuit of FIG. 9. In the circuit configuration of FIG. 9, even if the first and second circuit blocks are connected in the reverse order, the circuit can operate identically, which means the circuits are easy to manufacture.

Figure 10:
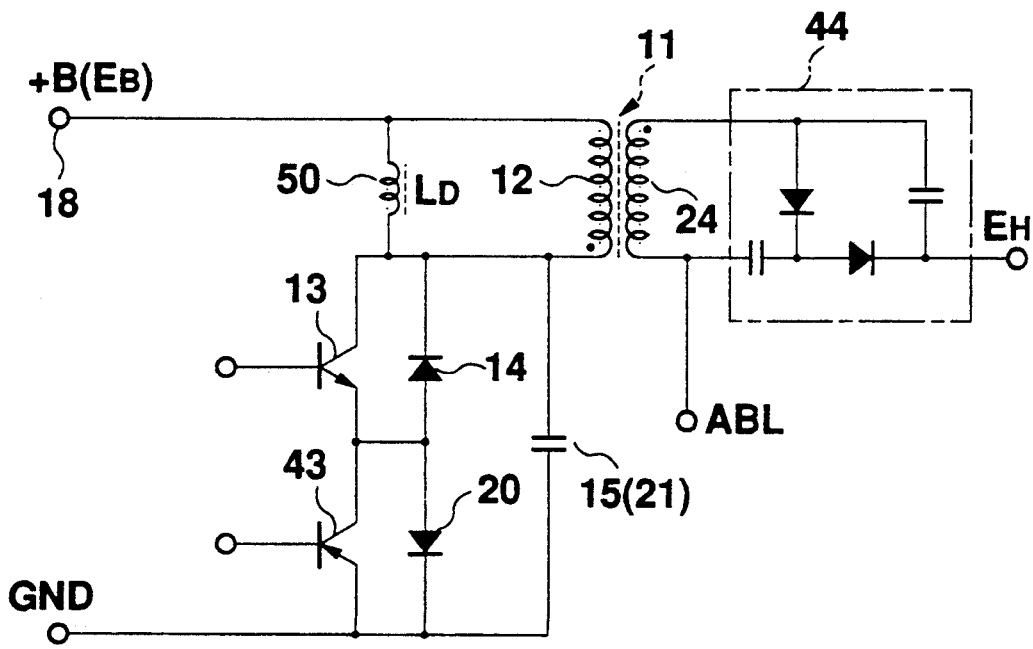
FIG. 10 is a circuit diagram of a high voltage generator according to a seventh embodiment.

FIG. 10 shows the circuit configuration of a high voltage generator according to the seventh embodiment. The high voltage generator comprises the first and the second circuit blocks which are connected in series with each other. The first circuit block includes the parallel combination of the transistor 13 serving as the first switching element d, and the diode 14, which is connected in series with the start side of the low-voltage coil 12. The second circuit block includes the transistor 43 serving as the second switching element e, and the diode 20, which are connected in parallel with each other. The high voltage generator also includes a voltage doubling rectifier circuit 44 at the high-voltage side of the flyback transformer 11. The remaining components are the same as those of the sixth embodiment.

In this embodiment, the resonance capacitor 15 is connected in parallel to the series circuit of the first and second circuit blocks. Like the charging capacitor 21, the resonance capacitor 15 also charges the electric energy of the inverse current flowing from ground to the power source.

Resonance is caused by the inductance of the low-voltage coil 12 and the electrostatic capacity of the resonance capacitor 15, when the forward current flows from the power source terminal 18 to ground, and when the inverse current flows from ground to the power source terminal 18. A resonance frequency of the forward current and that of the inverse current are the same.

Figure 11:
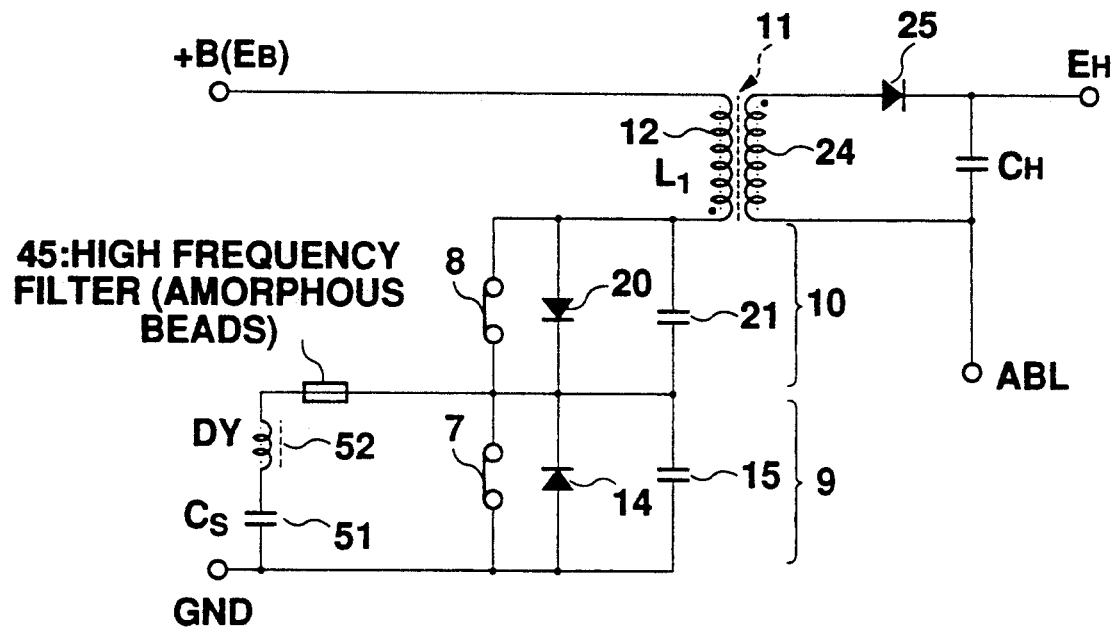
FIG. 11 is a circuit diagram of a high voltage generator according to an eighth embodiment.
Figure 12:
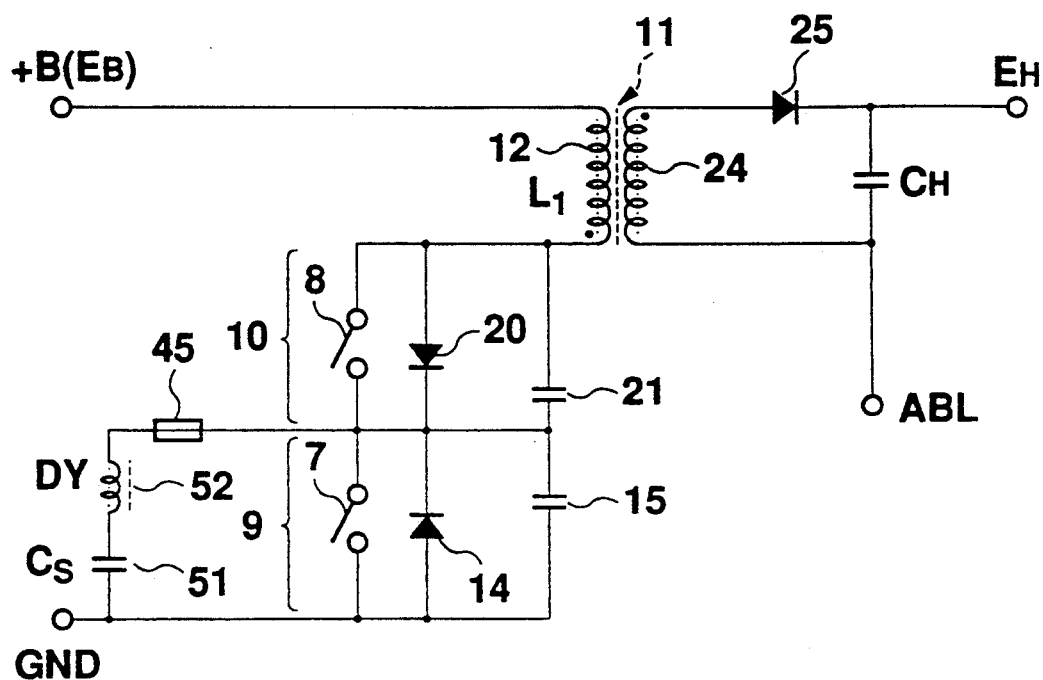
FIG. 12 is a circuit diagram of a high voltage generator according to a ninth embodiment.
Figure 13:
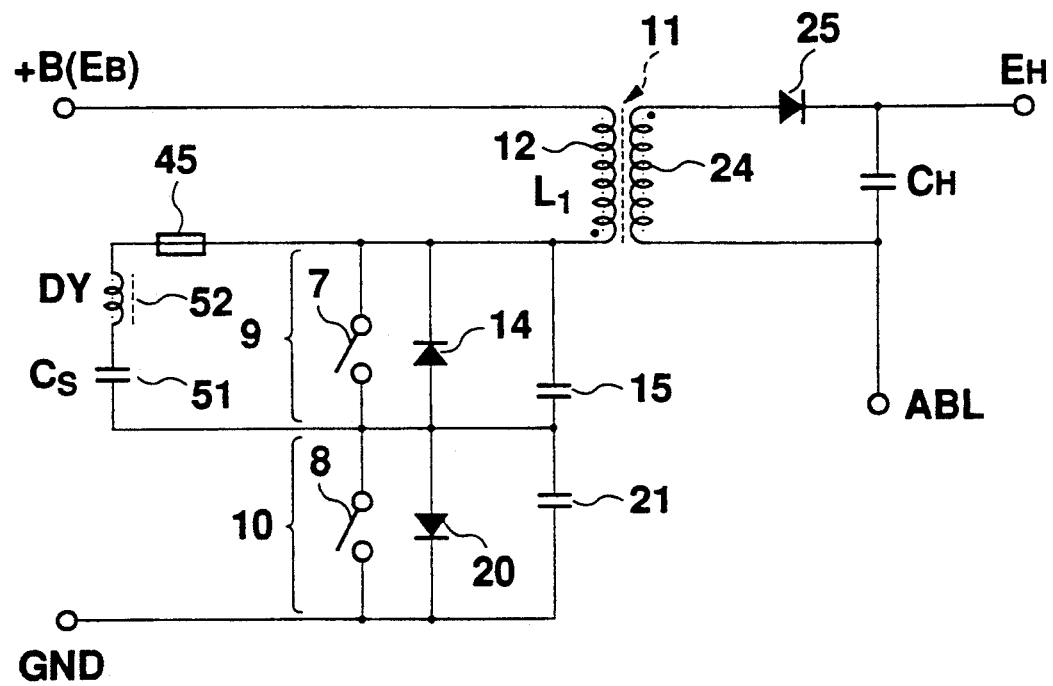
FIG. 13 is a circuit diagram of a high voltage generator according to a tenth embodiment.
Figure 14:
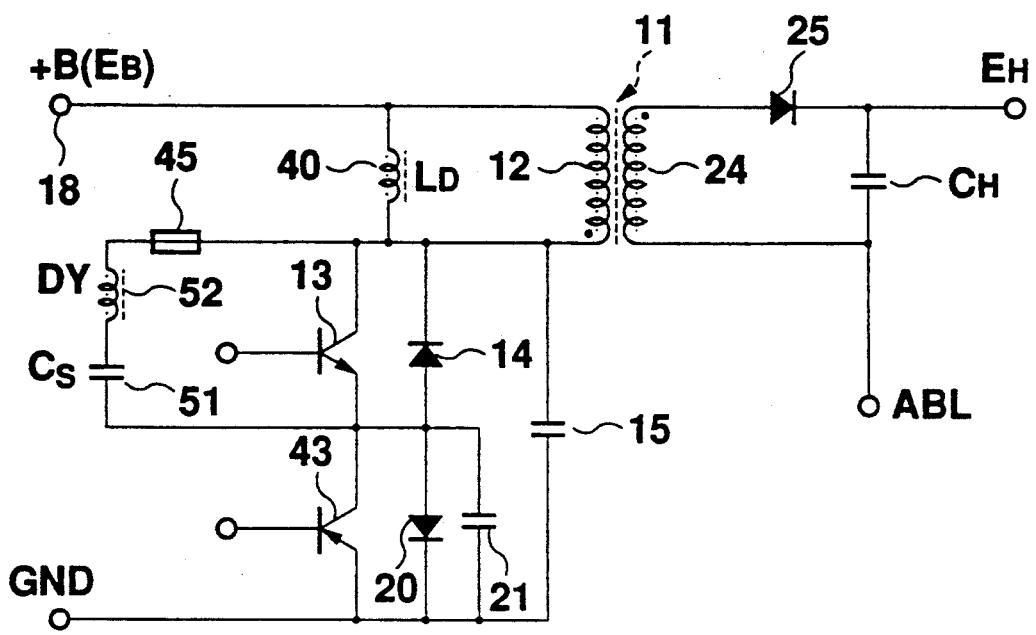
FIG. 14 is a circuit diagram of a high voltage generator according to an eleventh embodiment.
Figure 15:
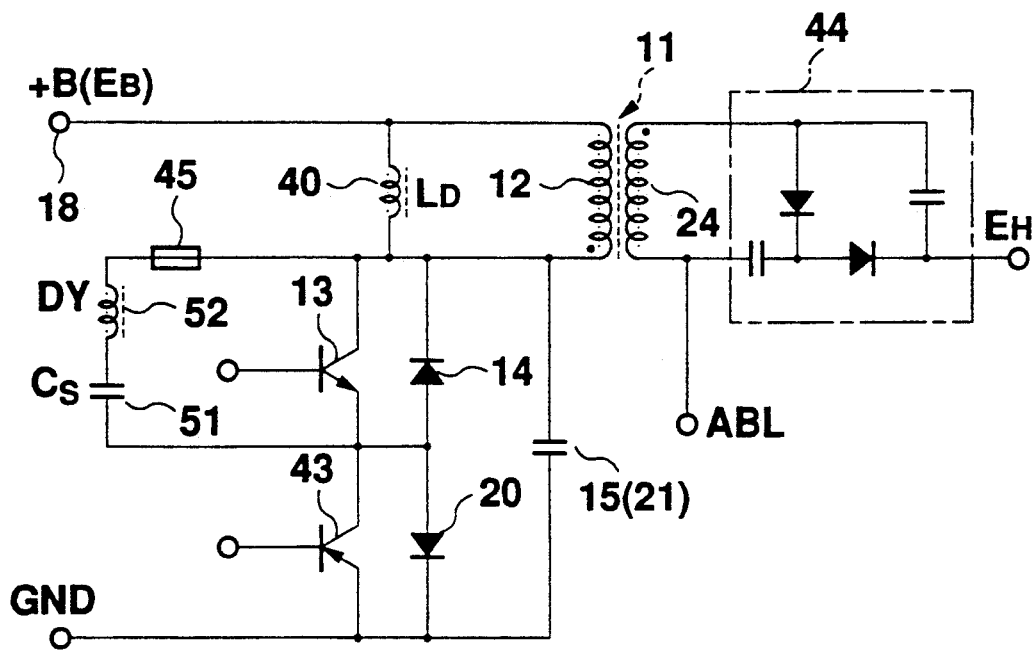
FIG. 15 is a circuit diagram of a high voltage generator according to a twelfth embodiment.
Figure 16:
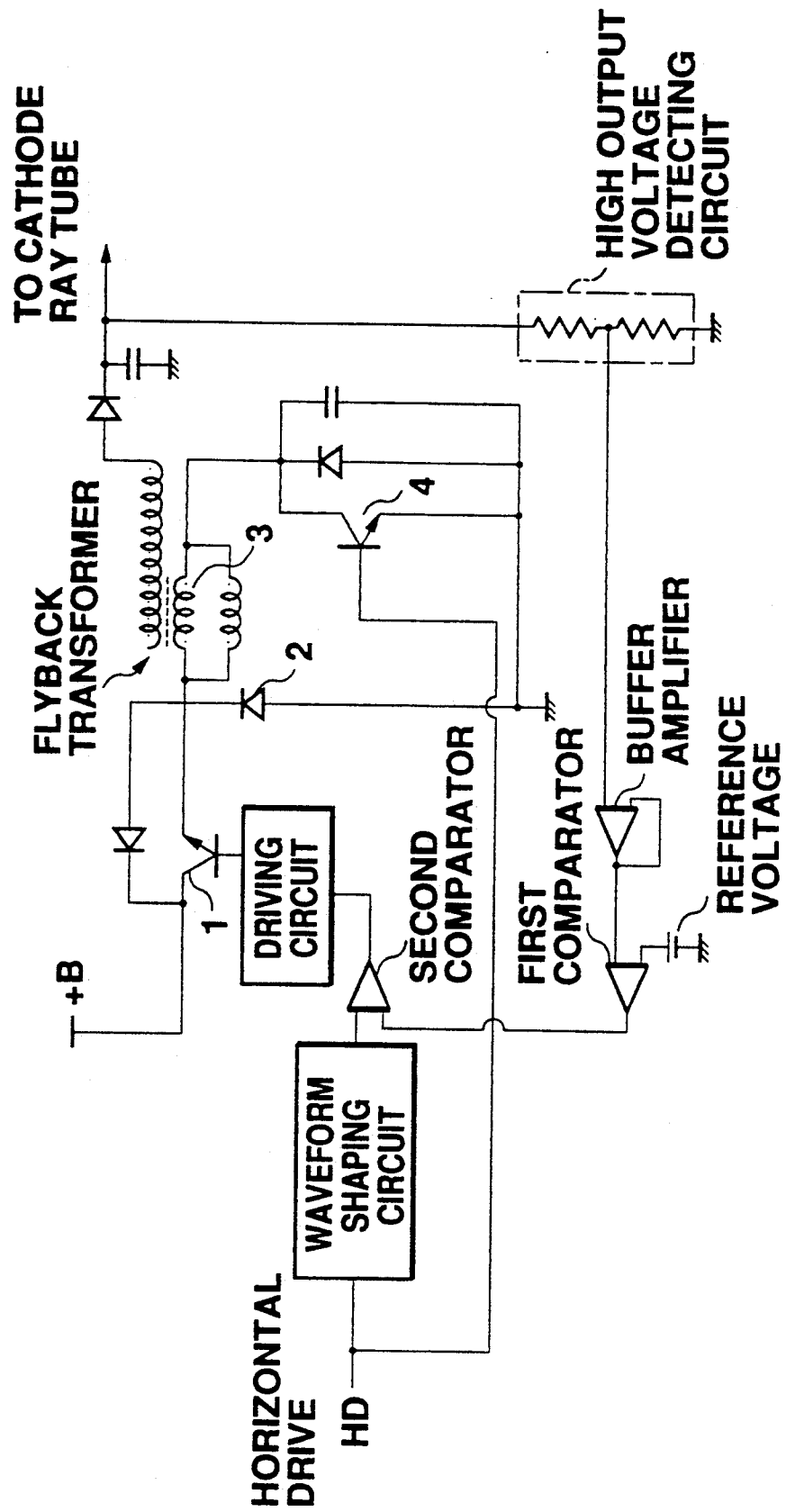
FIG. 16 is a circuit diagram of a conventional exemplary high voltage generator.
Figure 17:
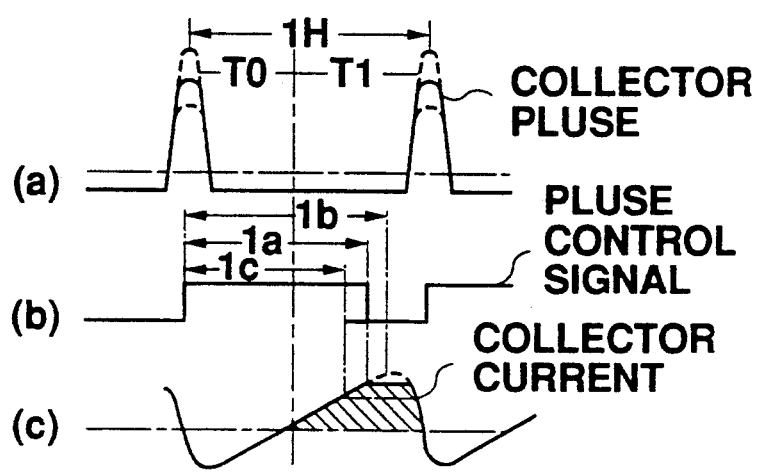
FIG. 17 shows the operation of the high voltage generator of FIG. 16.

FIG. 11 shows the circuit configuration of a high voltage generator according to the eighth embodiment. In this embodiment, a deflection yoke 52 (serving as an inductance element) connected in series to a capacitor 51 (for the S-shaped correction of the deflection current) are connected in parallel with the first switching element. The remaining components are the same as those in the fourth embodiment shown in FIG. 7.

The series circuit of the deflection yoke 52 and the capacitor 51 are connected in parallel to the first switching element 7, so that the high voltage generator can include the deflection circuit as its integral part. An amorphous bead core 45 is inserted between the series circuit of the deflection yoke 52 and capacitor 51, and the first switching element 7, thereby substantially preventing slight noise, generated by the turning-off of the second switching element, from being superimposed on the deflection current. A high frequency filter may be used instead of the bead core 45.

The circuit composed of the deflection yoke 51, capacitor 52 and bead core 45 can be incorporated into the circuits shown in FIGS. 7 and 8. FIGS. 12 to 15 show circuit configurations in which the circuit composed of the deflection yoke 52 and the capacitor 51 is coupled in parallel to the first switching element 13 in the circuits shown in FIGS. 9 and 10, so that the high voltage generator can have the deflection circuit as its integral part.

It should be noted that the present invention is not limited to the foregoing embodiments, and that it can be modified and changed as desired. In the foregoing embodiments, the first switching element is the transistor 13, and the second switching element is the MOS FET 17 or the transistor 43. However, the first switching element may be a MOS FET. Further, the first and second switching elements may be of any other available switching elements.

In the foregoing embodiments, the diode 20 is connected in parallel to the second switching element, e.g. MOS FET 17. However, this diode 20 may be dispensed with. In such a case, the circuit configuration has to be modified.

The amplified drive pulse signals for the first switching element (MOS FET 17) may be obtained from circuits other than the circuit used in the foregoing embodiments. A circuit is acceptable when it can generate a signal which can accelerate the time to turn off the second switching element as the high output voltage drops increasingly.

According to the invention, the second switching element is controlled to be turned off while the inverse current flows from the low-voltage coil to the drive power source. On the other hand, the on-time of the second switching element is controlled in response to the drop in the high output voltage. The period of time during which the inverse current flows to the charging capacitor is varied by controlling the timing turning off the second switching element, so that the intensity of the charging voltage is controlled so as to stabilize the high output voltage. Therefore, no large current is fed back in the closed loop as in the case with the convention high voltage generator so as to control the peak value of the flyback pulses. No power loss will be caused since no large current is fed back, and also the efficiency of the high voltage generator can be improved extensively.

The second switching element is turned off while the inverse current flows to the drive power source via the second switching element, which means that the second switching element is turned off at zero volts, and that no power loss will be caused. In addition, substantially no switching noise will be generated, thereby minimizing possible distortion in the displayed image.

The time to turn off the second switching element can be set as desired within the period during which the inverse current flows from the low-voltage coil to the drive power source. This means that the high voltage generator can extensively control the voltage drop, and be applicable to multiple scanning type television receivers, display units or the like. When the high voltage generator is applied to a single scanning type television receiver or a display unit which does not require extensive control of the drop in the high output voltage, the time to turn off the second switching element is variable in the flyback period. In such a case, no switching noise will be caused.

With the present invention, the high voltage generator compensates for the drop in the high output voltage by raising the peak value of the flyback pulses compared with when no compensation is carried out. The larger the peak value, the higher the voltage is applied to the primary side of the flyback transformer. Therefore, the power source voltage, the boost ratio of the flyback transformer, and the heat in the flyback transformer can be reduced, thereby reducing the loads applied to the electronic components which are used in the high voltage generator.

What is claimed is:

1. A high voltage generator comprising:
   (a) a flyback transformer including a low-voltage coil and a high voltage coil;
   (b) a first switching element which is turned on to store an energy of a forward current from a drive power source in the low-voltage coil, and is located in a path of current flowing through the drive power source, the low-voltage coil and ground;
   (c) a resonance capacitor whose charging and discharging operations are controlled by the first switching element so as to be resonant with the low-voltage coil in response to an on- and off-state of the first switching element;
   (d) an output voltage detecting means for detecting an output voltage of the high-voltage coil directly or indirectly; and
   (e) an input peak value controlling means for controlling the input peak value of the low-voltage coil in response to a variation of the detected voltage, said input peak value controlling means including:
   a second switching element located in the current path;
   a charging capacitor whose charging operation is controlled by the second switching element and whose voltage is used for biasing an input voltage to the low-voltage coil; and
   a means for controlling the on-off action of the first and second switching elements, said means turning on the second switching element substantially simultaneously with turning off the first switching element so as to transfer the energy stored in the low-voltage coil to the resonance capacitor, and said means turning off the second switching element after the transfer of the energy so that the charging capacitor is charged by an inverse current flowing from ground to the drive power source, thereby correcting the variation of the output voltage of the high-voltage coil by using the voltage of the charging capacitor.

2. A high voltage generator according to claim 1, wherein the output voltage detecting means rectifies an output of the high voltage coil so as to indirectly detect the output voltage of the high voltage coil as a rectifying value.

3. A high voltage generator according to claim 1, wherein the on-off action controlling means includes a horizontal drive circuit for providing a binary horizontal drive signal to control the on-off timing of the first switching element.

4. A high voltage generator according to claim 1, wherein the output voltage detecting means includes a means for detecting the output voltage of the high-voltage coil as a rectifying value by rectifies the output of the high voltage coil, and the on-off action controlling means includes an integrating means for integrating the horizontal drive signal, a comparing means for comparing the detected output voltage of the high-voltage coil and the integrated value of the horizontal drive signal, and a means for determining a time taken to turn off the second switching element according to the compared results.

5. A high voltage generator according to claim 1 further comprising a damper diode coupled in parallel to the first switching element.

6. A high voltage generator according to claim 1 further comprising a damper diode coupled in parallel to the second switching element.

7. A high voltage generator according to claim 1, wherein the second switching element and the charging capacitor are located at the drive power source side of the low-voltage coil.

8. A high voltage generator according to claim 1, wherein the second switching element and the charging capacitor are located at ground side of the low-voltage coil.

9. A high voltage generator according to claim 1 further comprising a DC cutoff capacitor coupled in series with the charging capacitor and having a larger electrostatic capacity than that of the charging capacitor.

10. A high voltage generator according to claim 1 further comprising a circuit coupled in parallel to the resonance capacitor so as to bear part of the current flowing to the low-voltage coil.

11. A high voltage generator according to claim 10, wherein the circuit for bearing part of the current includes a choke coil having an inductance and a capacitor coupled in series with the choke coil.

12. A high voltage generator according to claim 1 further comprising a series circuit of a deflection yoke and a capacitor for S-shaped correction of a deflection current, the series circuit being coupled in parallel to the first switching element.

13. A high voltage generator according to claim 12, wherein a noise reduction means is disposed between the first switching element and the series circuit of the deflection yoke and the capacitor for S-shaped correction of the deflection current so as to eliminate noise generated by the turning-off of the second switching element.

14. A high voltage generator comprising:
(a) a flyback transformer including a low-voltage coil and a high voltage coil;
(b) a first switching element which is turned on to store an energy of a forward current from a drive power source in the low-voltage coil, and is located in a path of current flowing through the drive power source, the low-voltage coil and ground;
(c) a resonance capacitor which is coupled in series with the low-voltage coil and whose charging and discharging operations are controlled by the first switching element;
(d) an output voltage detecting means for detecting an output voltage of the high-voltage coil directly or indirectly; and
(e) an input peak value controlling means for controlling the input peak value of the low-voltage coil in response to a variation of the detected voltage, said input peak value controlling means including:
a second switching element coupled in series with the first switching element;
a charging capacitor whose charging operation is controlled by the second switching element and whose voltage is used for biasing an input voltage to the low-voltage coil; and
a means for controlling the on-off action of the first and second switching elements, said means turning on the second switching element substantially simultaneously with turning off the first switching element so as to transfer the energy stored in the low-voltage coil to the resonance capacitor, and said means turning off the second switching element after the transfer of the energy so that the charging capacitor and the resonance capacitor are charged by an inverse current flowing from ground to the drive power source, thereby correcting the variation of the output voltage of the high-voltage coil by using the voltages of the charging capacitor and the resonance capacitor.

15. A high voltage generator according to claim 14 further including an inductance means for suppressing a leakage flux in the flyback transformer, the inductance means being coupled in parallel to the low-voltage coil.

16. A high voltage generator comprising:
(a) a flyback transformer including a low-voltage coil and a high voltage coil;
(b) a first switching element which is turned on to store an energy of a forward current from a drive power source in the low-voltage coil, and is located in a path of current flowing through the drive power source, the low-voltage coil and ground;
(c) a resonance capacitor which is coupled in series with the low-voltage coil and whose charging and discharging operations are controlled by the first switching element;
(d) an output voltage detecting means for detecting an output voltage of the high-voltage coil directly or indirectly; and
(e) an input peak value controlling means for controlling the input peak value of the low-voltage coil in response to a variation of the detected voltage, said input peak value controlling means including:
a second switching element coupled in series with the first switching element, the series circuit of the first and second switching elements being coupled in parallel to the resonance capacitor; and
a means for controlling the on-off action of the first and second switching elements, said means turning on the second switching element substantially simultaneously with turning off the first switching element so as to transfer the energy stored in the low-voltage coil to the resonance capacitor, and said means turning off the second switching element after the transfer of the energy so that the charging capacitor is charged by an inverse current flowing from ground to the drive power source, thereby correcting the variation of the output voltage of the high-voltage coil by the voltage of the resonance capacitor.

* * * * *